E. DAVROU.
PASTEURIZING APPARATUS.
APPLICATION FILED JULY 7, 1910.

979,830.

Patented Dec. 27, 1910.

UNITED STATES PATENT OFFICE.

EMILE DAVROU, OF PAWTUCKET, RHODE ISLAND.

PASTEURIZING APPARATUS.

979,830.  Specification of Letters Patent.  Patented Dec. 27, 1910.

Application filed July 7, 1910. Serial No. 570,724.

*To all whom it may concern:*

Be it known that I, EMILE DAVROU, a citizen of France, residing at Pawtucket, in the county of Providence and State of Rhode Island, have invented certain new and useful Improvements in Pasteurizing Apparatus, of which the following is a specification.

My invention relates to apparatus adapted to pasteurize milk, water, and other liquids and has for its essential objects portability, simplicity, cheapness, non-frangibility, under pronounced changes of temperature, adaptability to the circulation of the heating or cooling agent, and to an accurate testing of the temperature of the contents of the apparatus.

A further object is to accommodate the structure to the expansion of the contents during the performance of the pasteurizing process.

To the above ends essentially my invention consists in the novel construction and combination of parts hereinafter set forth, and coming within the scope of the appended claims.

Figure 1:
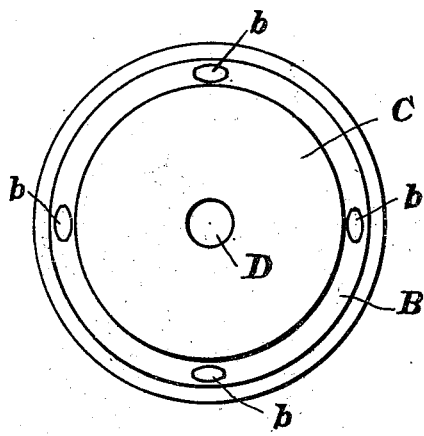
Figure 2:
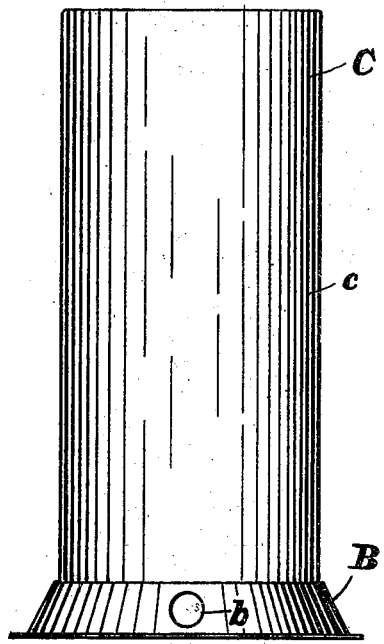
Figure 3:
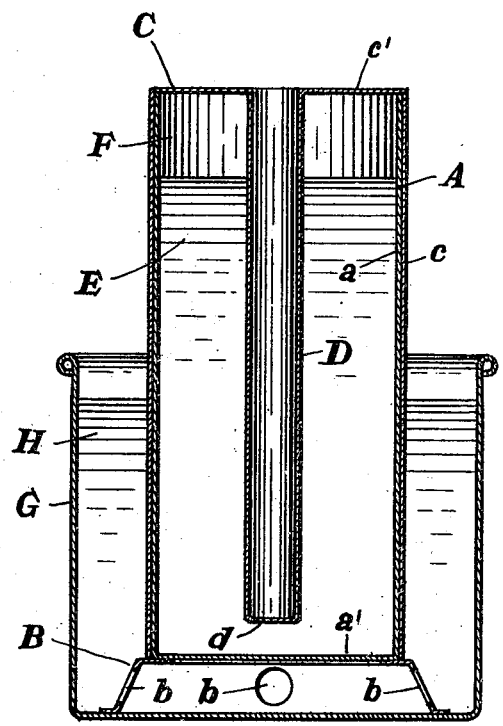

In the accompanying drawings which constitute a part of this specification, Figures 1 and 2, are plan and side elevations respectively of my novel apparatus or receptacle, and Fig. 3 a central vertical section of the same, and of a pan in conjunction with which my apparatus may be conveniently used.

Like reference characters indicate like parts throughout the views.

My novel device consists of a receptacle A comprising a side wall $a$, in the present instance, cylindrical in form, and a bottom $a'$. Fixed to or integral with the bottom is a downwardly directed supporting flange B provided with a plurality of openings $b$. A closure member C coöperates with the receptacle or body A comprising a cylindrical side $c$ of substantially the same length as the wall, $a$, and a top $c'$. Projecting downwardly from the center of the top is an integral tube D extending nearly the length of the closure member and provided with a closed bottom $d$. The walls $a$ and $c$ are in light frictional contact with each other, but the contact is not so intimate as to prevent the two parts sliding relatively to each other.

In operating my apparatus the milk or other liquid which is to be pasteurized is poured into the receptacle A until it nearly fills the same, preferably leaving a space F above said liquid. The described device is then subjected to a high temperature and then a low temperature to effect the desired results. This is done by subjecting my device successively to the external application of hot and cold water. One way is that shown, namely to rest the flange B upon the bottom of a pan G or other vessel surrounding the device and inclosing the same for some distance in its bottom. The heating or cooling liquid H is held by the vessel G, and the openings $b$ permit a free circulation of the liquid H against the bottom of the receptacle A as well as elsewhere.

The tube D is purposed to permit the insertion therein of a thermometer to determine the temperature of the liquid E. Its central location insures the accurate temperature of the interior of the liquid body during the process, rather than the mere outer temperature; and insures the desired effect without the immersion of the thermometer in the liquid itself which is undesirable.

The extended contact area of the walls $a$ and $c$ assists in preventing the penetration of external air, and the joint formed by the lower edge of the wall $c$ being located so near the base of the apparatus insures a water seal when the apparatus is located in a vessel.

The slidable relation of the parts A and C permits the housing C to rise or yield somewhat when steam or gases generate in the space F and thus minimizes the danger of explosion.

What I claim is,—

1. In a pasteurizing apparatus, the combination of a receptacle comprising a side wall, a bottom, and means for supporting the same, and a closure member, comprising a side wall slidably engaging the receptacle wall and movable with relation thereto under pressure and of substantially the same length as the receptacle wall, and a top.

2. In a pasteurizing apparatus, the combination of a receptacle comprising a side wall, a bottom, and means for supporting the same, and a closure member comprising a side wall surrounding the first mentioned wall and movable with relation thereto under pressure, a top upon the wall of the closure, and a tube provided with an open upper end and a closed lower end located in the top and extending within the receptacle.

3. In a pasteurizing apparatus, the combination of a receptacle comprising a side wall and a bottom, a downwardly extending flange upon said bottom provided with openings, and a closure member comprising a wall engaging the first mentioned wall and movable with relation thereto under pressure, a top upon the closure wall, and a closed tube in the top extending into the receptacle.

4. In a pasteurizing apparatus, the combination with a receptacle comprising a side wall and a bottom, a downwardly directed flange upon the receptacle provided with openings, a closure member comprising a wall slidably engaging the exterior of the first mentioned wall and movable with relation thereto under pressure, and a tube closed at its lower end extending into the receptacle.

5. A portable pasteurizing apparatus comprising a receptacle having a bottom and an open top, a support therefor having perforations adjacent the bottom of said receptacle and a closure member comprising a depending wall snugly embracing said receptacle and a top closing the open end thereof, said top having depending centrally therefrom a tube closed at its bottom.

In testimony whereof I have affixed my signature in presence of two witnesses.

EMILE DAVROU.

Witnesses:
  HORATIO E. BELLOWS,
  GEORGE H. McLAUGHLIN.